Sept. 30, 1952  E. C. MILLER  2,612,608
PHOTOMETRIC ANALYZER
Filed March 6, 1950  2 SHEETS—SHEET 1
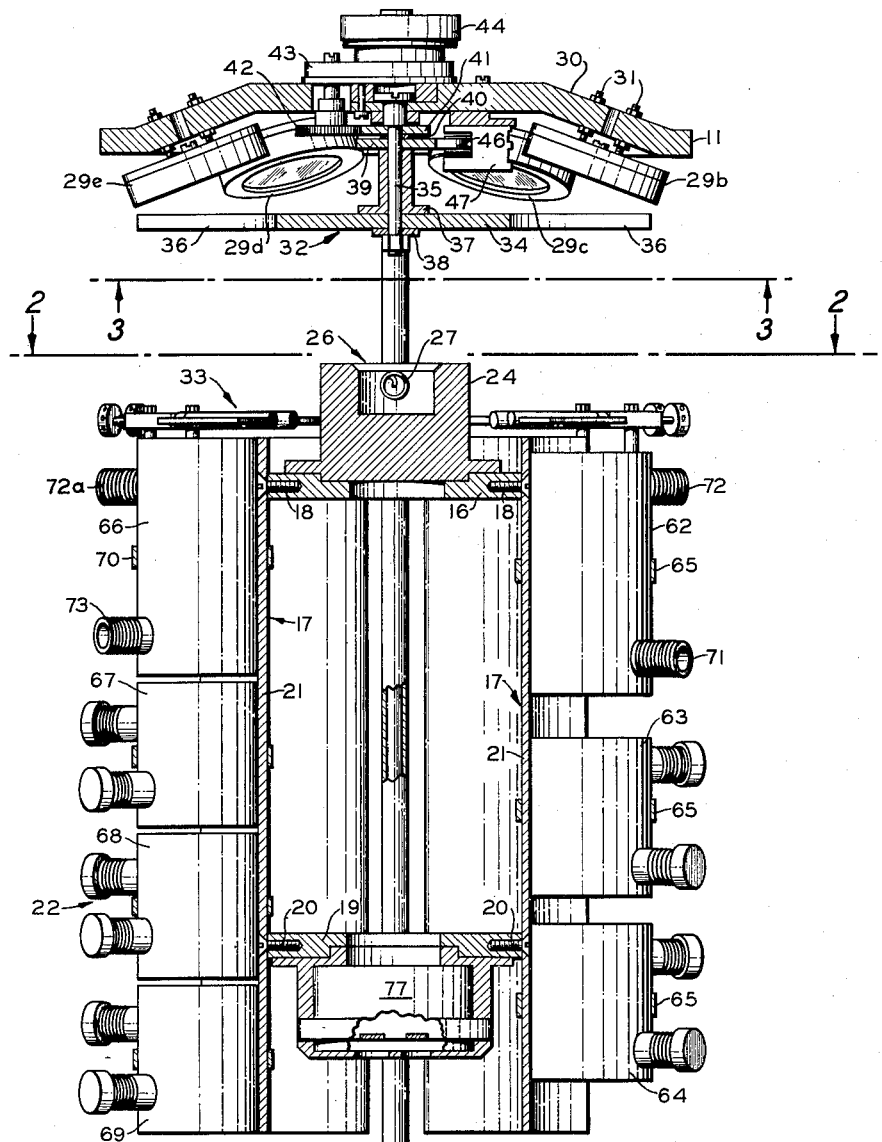
FIG. 1.
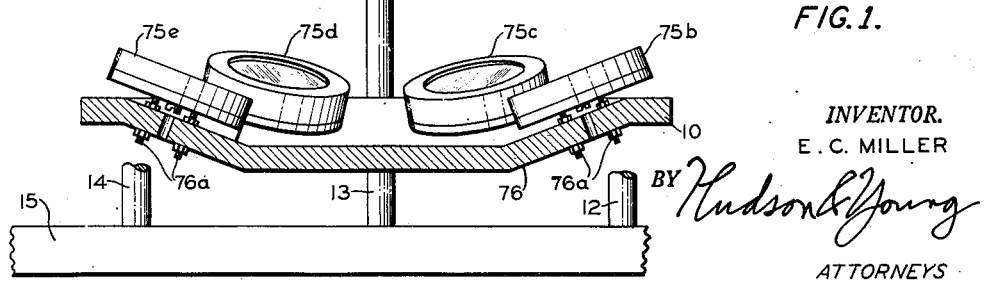
INVENTOR.
E. C. MILLER
BY Hudson & Young
ATTORNEYS Sept. 30, 1952     E. C. MILLER     2,612,608
PHOTOMETRIC ANALYZER Filed March 6, 1950     2 SHEETS—SHEET 2

INVENTOR.
E. C. MILLER
BY Hudson & Young
ATTORNEYS

Patented Sept. 30, 1952

2,612,608

UNITED STATES PATENT OFFICE 2,612,608

PHOTOMETRIC ANALYZER

Elmer C. Miller, Bartlesville, Okla., assignor to Phillips Petroleum Company, a corporation of Delaware Application March 6, 1950, Serial No. 147,979

17 Claims. (Cl. 250—43.5)

This invention relates to an analyzer in which radiation is passed through a sample to be analyzed, changes in properties or composition of the sample producing representative changes in the transmission of the radiation. In one specific aspect, it relates to such an analyzer in which a plurality of different streams are recurrently and successively analyzed. In another specific aspect, it relates to such an analyzer in which one stream is analyzed to determine the proportions of a plurality of components therein.

Heretofore, analyzers have been proposed in which a beam of radiation passes between a source and a radiation detector, arrangements being provided for successively interposing various samples of fluids to be analyzed between the radiation source and detector, the resultant changes in the radiation incident upon the detector being representative of the composition of the sample. Thus, where the analyzer is to function with a plurality of sampling devices, it is necessary that different sample cells be successively passed between the source and detector. In order to obtain proper optical conditions, precise alignment of the sample cell with respect to the radiation detector is required, and this is quite difficult to obtain with a mechanical device for successively moving different cells between the source and detector. It is also known in the art to provide two radiation beams which are directed upon separate detector units, one of these beams passing through a standard cell containing a pure component which is to be analyzed for, and the sample itself flowing through the other cell which is interposed between the second radiation source and detector. Electrical comparison of the detector outputs, as by a Wheatstone bridge circuit, produces an unbalance voltage which is a measure of the percentage of the desired component in the sample. It is customary in such devices to provide other cells in each optical path. For example, interference cells may be provided to remove unwanted frequencies from the radiation incident upon the detectors and filters of various types may be inserted in the optical path to perform the same function. Heretofore, such analyzers have not been adapted for analyzing a plurality of different streams in a recurrent manner nor for determining percentage of several different components in a sample stream, as in a refinery, without the provision of complicated mechanical devices for providing accurate alignment of the parts in each of several positions.

It is an object of this invention to provide an analyzer which is suitable for measuring a plurality of streams or determining the percentages of different components in a single stream without the necessity for providing precise optical alignment as a number of sample cells are successively moved into alignment with an optical system.

It is a further object to provide such an analyzer which is suitable for use in diversified applications of process indication and control.

It is a still further object to provide such apparatus constructed in a durable manner with a minimum number of moving parts and having a high degree of reliability.

Various other objects, advantages and features of the invention will become apparent from the following detailed description taken in conjunction with the accompanying drawings, in which:

Figure 1 is a vertical, sectional view, partially in elevation, of the apparatus of this invention.

Figures 2 and 3 are, respectively, sectional views taken along the lines 2—2 and 3—3 of Figure 1.

Figure 2:
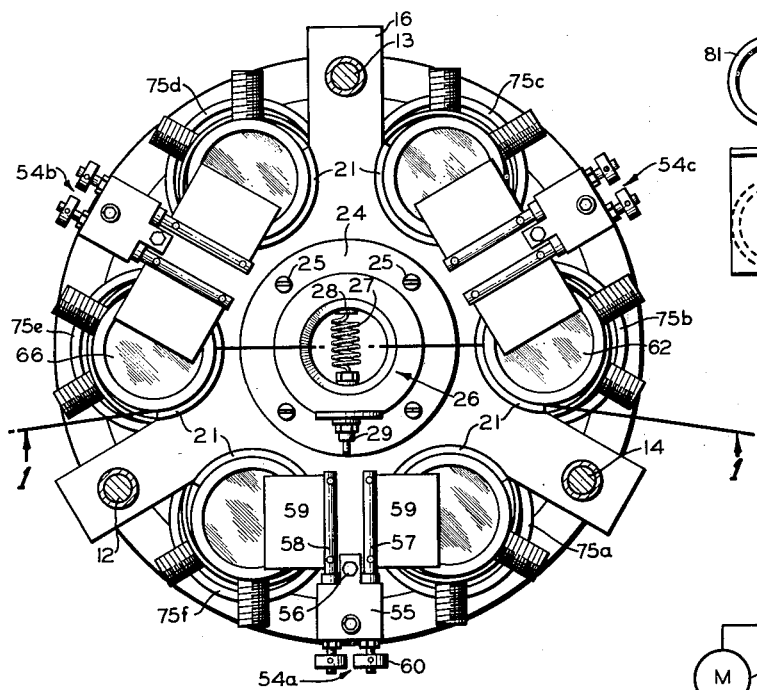

Referring now to the drawings in detail and particularly to Figures 1 and 2, the apparatus includes a pair of spaced, generally circular supports or decks 10, 11 which are interconnected by rods 12, 13 and 14, these rods extending through the deck 10 to a base 15 which supports the whole assembly in an upright position. The rods 12, 13 and 14 also support a deck 16, Figure 2, which, in turn, is rigidly secured to a plurality of cell assemblies 17, as by screws 18. The lower end of each assembly 17 is rigidly attached to a deck 19 by screws 20 and the deck 19, in turn, is supported by the rods 12, 13 and 14. Each assembly 17 is composed of a plurality of arcuate cell supports 21 which extend between decks 16, 19 and are secured thereto by the screws 18 and 20. Each cell support 21 consists of an elongated channel or track of generally semicircular cross section and each such cell support is adapted to receive a plurality of cells, generally indicated by reference numeral 22, which will be described in more detail hereinafter.

The deck 16 has a metal base member 24 secured to the central region thereof, as by screws 25, and the member 24, in turn, carries a radiation source 26. In the present example, infra-red radiation is utilized and, accordingly, the radiation source may consist of a coil 27 of resistance wire having one end thereof connected to ground at 28 through the member 24 and having its other end connected to an insulated binding post 29 secured to the member 24. The type of radiation source will, of course, vary with the type of radiation utilized in the analyses. For example, an ultra-violet lamp, an incandescent lamp, or any other suitable type of radiation source may be substituted for the coil 27 depending upon the wave length of radiation desired.

The radiation produced by coil 27 is reflected by concave mirrors 29a to 29f, inclusive, arranged in circular formation at the underside of deck 11, each mirror 29 being supported from an inclined portion 30 of the deck by adjusting screws 31. The radiation beams reflected by the mirrors 29 pass in parallel paths through a shutter assembly 32 and a trimmer assembly 33 to the respective cell units 22.

The shutter assembly 32 includes a shutter 34 of opaque material rotatably mounted upon a pin 35 protruding downwardly from deck 11. The shutter consists of a thin circular sheet of metal having two diametrically opposite openings 36 formed therein which are adapted to register, respectively, with the radiation beams incident upon and reflected from two diametrically opposite mirrors 29. The central part of the shutter abuts one end of a sleeve 37 rotatably mounted upon pin 35 and is forced into engagement therewith by a collar 38. The other end of sleeve 37 bears against a cam 39 which is separated by a collar 40 from a gear 41 also rotatably mounted upon the pin 35. Gear 41 meshes with a gear 42 which, in turn, is coupled through gearing 43 to a motor 44.

Figure 5:
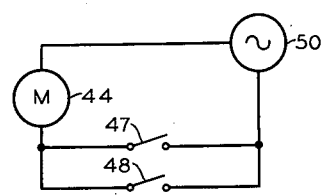
Figure 5 is a schematic circuit diagram of an electrical circuit associated with the analyzer.
Figure 3:
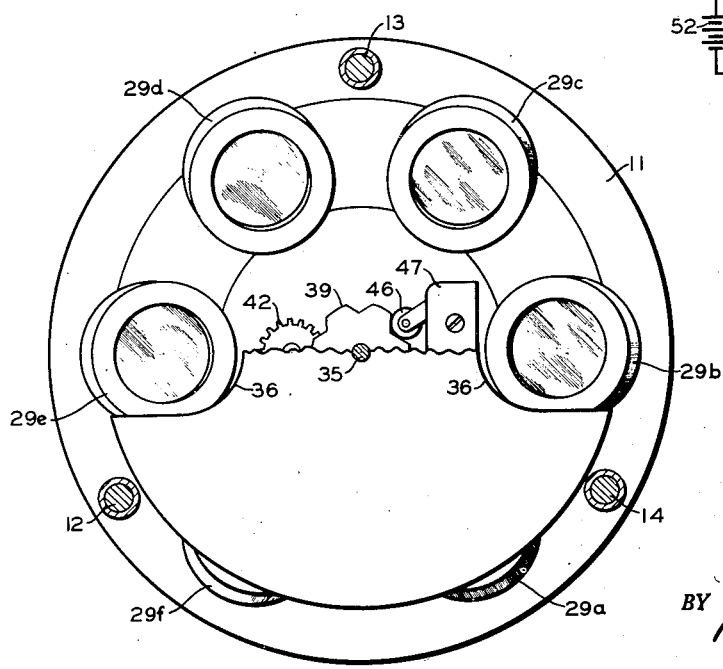

When gear 41 is driven through gears 42, 43 by motor 44, the cam 39, sleeve 37, and shutter 34 all rotate as a unit. The cam 39 is engageable by a roller 46 forming a part of a snap action switch unit 47. The motor and switch are connected in an electrical circuit in the manner shown by Figure 5, from which it will be noted that switch 47 is connected in parallel with the contacts 48 of a relay 49, these parallel connected switches being connected in series with a current source 50 and the motor 44. The energizing circuit of relay 49 is connected in circuit with a timer 51 and a battery or other current source 52. When roller 46 is positioned within a notch of cam 39, switch 47 is open. The switch 48 is normally open and is closed whenever relay 49 is energized. Accordingly, upon periodic actuation of the timer 51, the relay 49 is periodically energized and, at each energization, the contacts 48 are momentarily closed. This initiates rotation of motor 44 and causes roller 46 to move out of a notch of cam 39 with the result that switch 47 is closed and remains closed until the roller 46 reaches the next succeeding notch of cam 39. In the position of the parts shown in Figure 3, the openings 36 are positioned adjacent mirrors 29b, 29e. When timer 51 is energized, the motor 44 moves the shutter in a clockwise direction, Figure 3, until the openings 36 are positioned adjacent mirrors 29c, 29f. Thereupon, the roller is positioned within a notch of cam 39 and the motor stops in this position until the next succeeding energization of timer 51. The next actuation of the timer moves the shutter 34 until the openings 36 are positioned adjacent mirrors 29a, 29d. It will be apparent, therefore, that the described recurrent operation of timer 51 causes the openings 36 in the shutter to be positioned successively adjacent the mirror sets 29e and 29b, 29c and 29f, and 29a and 29d. This action causes successive actuation of the analyzer units in the manner hereinafter described.

The trimmer assembly 33 includes three units 54a, 54b, and 54c each unit including a mounting bracket 55 secured to deck 16, as by a bolt 56, and each bracket having two rotatable pins 57, 58 journalled therein. Each pin is provided with a flat piece 59 of metal which functions as a shutter, the angular position of each shutter being adjustable by a nut 60. These shutters constitute means for varying the intensity of the radiation beams passing from the respective mirrors 29 to the cell units 17.

The cell units 17 may be of varied types of construction. For convenience, I will describe a cell for determining the percentage of isobutane present in a sample stream containing n-butane, isobutane, and propane. Assuming shutter 34 to be positioned with the shutter openings adjacent mirrors 29b and 29e, a beam of radiation from source 27 is reflected from mirror 29b and, thence, passes successively through cells 62, 63 and 64 which are secured to the adjacent channel or track 21 by clamps 65. At the same time, a radiation beam is reflected from mirror 29e and passes, in a parallel path, successively through cells 66, 67, 68 and 69 which are secured to the adjacent channel or track 21 by clamps 70. The stream to be tested passes through an inlet 71 of cell 62, thence through outlet 72 and a conduit, not shown, to an inlet 72a of cell 66, and finally to an outlet 73. Cells 67, 68 and 69 are filled with pure samples of n-butane, isobutane and propane. Accordingly, the radiation passing through cells 66 to 69, inclusive, does not contain radiation of the frequencies absorbed by the three components of interest in the test sample. That is, the radiation passing through this cell system is insensitive to changes in concentration of n-butane, isobutane or propane in the test sample passing through cell 66, although it is influenced by changes in temperature, density and concentration of other components in the test sample to the same extent as the beam passing through cell 62. Thus, the beam leaving cell 69 serves as a standard or reference against which the radiation intensity varying in accordance with changes of a selected component may be readily compared.

At this point, it should be noted that the ends of each cell are provided with radiation-transparent windows so that the beams can pass successively through the cells. In the example shown, cell 63 contains pure n-butane and cell 64 contains pure propane. Accordingly, the radiation passing through cells 62, 63 and 64 is insensitive to changes in the concentration of n-butane or propane in the sample flowing through cell 62, since the radiation of wave lengths corresponding to the absorption bands of these two substances is absorbed within the cells 63 and 64. The radiation beam passing through these cells, however, is sensitive to changes in the concentration of isobutane. Thus, when the intensity of the radiation beams is compared, the difference in radiation intensity between the two beams is proportional to the isobutane content of the sample stream.

In order to effect the described comparison, the deck 10 is provided with concave mirrors 75a to 75f corresponding to the mirrors 29, each mirror being mounted on an inclined portion 76 of deck 10 by bolts 76a. The parallel beams from the cell units 17 are reflected from mirrors 75 and enter a twin radiation detector assembly 77, the beams from mirrors 75d, 75e and 75f being incident upon one detector, and the beams from mirrors 75a, 75b and 75c being incident upon the other detector assembly. In the case of infra-red radiation, the detectors are bolometers, two such units being provided within the assembly 77. These bolometers are connected in a Wheatstone bridge circuit well known to those skilled in the art and this bridge circuit is connected to an indicating or recording device which indicates the difference in intensity of the beams incident upon the twin detector unit and, hence, a quantity proportional to the concentration of isobutane in the test sample.

In the present example, a similar cell structure corresponding to that already described is provided between the mirrors 29d, 75d on the one hand and mirrors 29a, 75a on the other hand. However, the cells corresponding to cells 63 and 64 are filled with isobutane and propane rather than n-butane and propane. The radiation incident upon mirror 75a, therefore, varies in intensity in accordance with variation in the content of n-butane in the test sample. Thus, when the shutter 34 is in such position that the openings 36 are adjacent mirrors 29a and 29d, the detector circuit indicates the concentration of n-butane in the test sample. A similar cell system is provided between the mirrors 29f, 75f on the one hand and mirrors 29c, 75c on the other hand except that the cells corresponding to cells 63 and 64 are filled with pure n-butane and pure isobutane. The radiation incident upon mirror 75c, therefore, varies in intensity in accordance with variation in the content of propane in the test sample. As a result, when the shutter is positioned with openings 36 adjacent mirrors 29c and 29f, the output of the detector circuit is proportional to the concentration of propane in the test sample.

It will be apparent, therefore, that as the timer 51 is recurrently actuated and the openings 36 in shutter 34 successively move to positions in front of mirrors 29b and 29e, 29c and 29f, and 29a and 29d, the sample stream is successively analyzed to determine the proportions of isobutane, propane, and n-butane therein. Hence, a recorder connected to the output of the detector circuit will successively record the concentrations of these three components in the sample stream. The trimmer assemblies 54 are initially adjusted to equalize the intensity of the radiation beams passing through the cells and need not be adjusted during subsequent operation. Accordingly, the optical system contains no moving parts and there is no problem of successive alignment such as would be encountered if the cell units were successively moved into position mechanically in a single optical system. Moreover, the system is very flexible, since the arrangement of cells traversed by the parallel beams may be readily varied simply by adding or removing cells from the channels 21. However, only one source and one bolometer system is required to record the concentration of three or more components in the test stream.

Since the cell units associated with mirrors 29d and 75d, 29e and 75e, and 29f and 75f, are all of identical construction, it will be evident that only one set of cells need be provided to furnish the standard radiation intensity for comparison purposes. In this manner, the described system could be utilized to record percentages of five components in a test stream since five other cell units are then available. In modifying the apparatus to such an end, the standard cells with their attendant optical system may be moved outwardly beyond the radius of the other cells or, alternatively, the mirror 29e may be positioned below the shutter 34 so that radiation is always supplied to the cells associated therewith. In such a modifications, the cam 39 is modified so that the single shutter opening required moves from mirror 29d past 29e to mirror 29f with the result that the radiation intensity passing through the standard cell unit is at all times compared with one of the five other units. This may be very readily accomplished simply by omitting one notch from the cam.

It is preferable, however, to utilize three identical systems in the manner described in the first embodiment of the invention for this increases the flexibility of the apparatus. Thus, merely by rearranging the sample cells, three separate streams may be successively and recurrently analyzed, the readings appearing upon a common indicator or recorder unit. Thus, one stream is passed through cells 62, 66 with appropriate materials being placed in the cells 63, 64, 67, 68 and 69. An entirely different sample stream is fed to the cells associated with the mirrors 29d and 29a and separate additional cells are provided in connection with each of the sample cells, while a third stream may be analyzed in the units associated with mirrors 29a and 29f. Thus, the apparatus of my invention permits great flexibility and sample cells, interference cells or any desired types of filters may be readily changed as desired by connecting them at approapriate regions of the channel 21.

Figure 4:
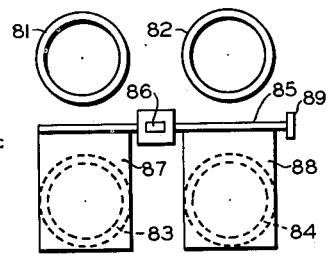
Figure 4 is a schematic view illustrating a modification of the invention.

It will be further apparent that each set of cells passes through a period when the recording unit is not responsive to the radiation passing therethrough, the shutter 34 preventing the passage of radiation through the cells during this period. It will further be obvious that the apparatus of my invention is not restricted to the use of six optical channels, it being possible to use more or less channels as desired. When four channels are utilized it is possible to simplify the shutter arrangement in the manner shown in Figure 4, wherein reference numerals 81, 82, 83 and 84 represent mirrors corresponding to the mirrors 29 of Figure 1. A small rock shaft 85 is journalled in a bearing 86 and this shaft carries two shutter plates 87 and 88 which may prevent passage of radiation to mirrors 81, 82 or 83, 84, as desired. The shutters may be moved from one position to the other manually, as by knob 89, or they may be driven automatically by a motor-timer mechanism in the manner shown in Figure 1.

While the invention has been described in connection with a present, preferred embodiment thereof, it is to be understood that this description is illustrative only and is not intended to limit the invention, the scope of which is defined by the appended claims.

I claim:

1. In a photometric analyzer, in combination, a radiation source, a radiation detector, reflecting means to form a plurality of radiation beams extending between said source and said detector, a plurality of cells disposed in the path of the respective radiation beams and adapted to hold a substance preferentially absorbing certain wave lengths of said radiation, and a rotatable shutter of opaque material disposed in the path of said radiation beams for selectively permitting passage of selected beams of radiation between said source and said detector while preventing the passage of other beams between said source and said detector.

2. In a photometric analyzer, in combination, a radiation source, a radiation detector, reflecting means to form a plurality of parallel radiation beams extending between said source and said detector, a plurality of cells disposed in the path of the respective radiation beams each adapted to hold a substance preferentially absorbing certain wave lengths of radiation, and a motor driven rotatable shutter of opaque material disposed in the path of said radiation beams, said shutter having an opening therein for permitting passage of a selected beam of radiation therethrough.

3. In a photometric analyzer, in combination, a radiation source, a radiation detector, reflecting means to form a plurality of radiation beams extending between said source and said detector, a plurality of cells disposed in the path of the respective radiation beams and adapted to hold a substance preferentially absorbing certain wave lengths of radiation, a movable shutter of opaque material disposed in the path of said radiation beams, said shutter having an opening therein for permitting passage of a selected beam of radiation therethrough, a motor for driving said shutter, a cam driven by said motor, and a cam-actuated switch connected in the motor circuit to deenergize said motor each time the shutter opening is in position to permit passage of one of said radiation beams.

4. An analyzer constructed in accordance with claim 3 in which the radiation source is a heated filament capable of emitting infra-red radiation and the radiation detector is a bolometer.

5. A photometric analyzer comprising, in combination, a radiation source, a radiation detector, a plurality of mirrors for reflecting radiation from said source along a plurality of parallel paths, a plurality of mirrors spaced from said first-mentioned mirrors for reflecting said parallel beams upon said detector, a series of channel members each adapted to hold a plurality of fluid-containing cells in position to be traversed by one of said radiation beams, and a movable shutter of opaque material positioned to prevent passage of said radiation beams, said shutter having at least one opening formed therein to permit passage of at least one beam of radiation from the source to the detector in each of several shutter positions.

6. A photometric analyzer comprising, in combination, a radiation source, a radiation detector, a plurality of mirrors for reflecting radiation from said source along a plurality of parallel paths, a plurality of mirrors spaced from said first-mentioned mirrors for reflecting said parallel beams upon said detector, a series of channel members each adapted to hold a plurality of fluid-containing cells in position to be traversed by one of said radiation beams, a movable shutter of opaque material positioned to prevent passage of said radiation beams, said shutter having at least one opening formed therein to permit passage of at least one beam of radiation from the source to the detector in each of several shutter positions, and a series of trimmer assemblies one for each beam, each trimmer comprising an opaque plate which is movable into and out of a path of radiation beam to control the amount of radiation passing between the source and the detector in said beam.

7. A photometric analyzer comprising, in combination, a radiation source, a radiation detector, a plurality of mirrors for reflecting radiation from said source along a plurality of parallel paths, a plurality of mirrors spaced from said first-mentioned mirrors for reflecting said parallel beams upon said detector, a series of channel members each adapted to hold a plurality of fluid-containing cells in position to be traversed by one of said radiation beams, a movable shutter of opaque material positioned to prevent passage of said radiation beams, said shutter having at least one opening formed therein to permit passage of at least one beam of radiation from the source to the detector in each of several shutter positions, a motor for driving said shutter, a cam driven by said motor, a normally closed switch connected in the motor circuit and actuated by said cam to interrupt the motor circuit at each of said several shutter positions, and a timer constructed and arranged to supply a short driving pulse to said motor at each energization thereof.

8. A photometric analyzer comprising, in combination, a pair of spaced generally circular support decks, a radiation source and a twin radiation detector unit mounted between said decks along a line connecting the axes of said decks, a plurality of mirrors arranged in circular formation upon one of said decks to reflect radiation from said source in paths generally parallel to said axial line, a plurality of mirrors on the other deck for reflecting at least one of said beams upon one of said detector units and for reflecting the other beams upon the other detector unit, a plurality of axial supporting channels, one for each beam, at least one fluid-containing cell disposed in each channel to permit passage of the associated radiation beam through the fluid in said cell, a shutter of opaque material for preventing passage of radiation from said source to said first mirrors, said shutter having an opening therein to permit passage of radiation from said source to at least one of said first mirrors and reflection thereof through said cells to the other of said mirrors, and means for moving said shutter to several different positions, thereby to selectively permit passage of selected radiation beams from said source to said detector unit.

9. A photometric analyzer comprising, in combination, a pair of spaced generally circular support decks, a radiation source and a twin radiation detector mounted between said decks along a line connecting the axes of said decks, a plurality of mirrors arranged in circular formation upon one of said decks to reflect radiation from said source in paths generally parallel to said axial line, a plurality of mirrors on the other deck for reflecting at least one of said beams upon one of said detector units and for reflecting the other beams upon the other detector unit, a plurality of axial supporting channels, one for each beam, at least one fluid-containing cell disposed in each channel to permit passage of the associated radiation beam through the fluid in said cell, a shutter of opaque material for preventing passage of radiation from said source to said first mirrors, said shutter having an opening therein to permit passage of radiation from said source to at least one of said first mirrors and reflection thereof through a fluid-containing cell to the other of said mirrors, a motor for driving said shutter, thereby to move said opening to several different positions to permit passage of at least one selected radiation beam between said source and said detector, a cam driven by said motor, a cam actuated switch connected in the motor circuit to interrupt same at each of said several positions, and a timer for supplying short pulses of current to said motor to override the opening of said cam-operated switch and permit movement of the shutter to the next of said several positions.

10. A photometric analyzer comprising, in combination, a pair of spaced generally circular support decks, a radiation source and a twin radiation detector mounted between said decks along a line connecting the axes of said decks, a plurality of mirrors arranged in circular formation upon one of said decks to reflect radiation from said source in paths generally parallel to said axial line, a plurality of mirrors on the other deck for relecting at least one of said beams upon one of said detector units and for reflecting the other beams upon the other detector unit, a plurality of axial supporting channels, one for each beam, at least one fluid-containing cell disposed in each channel to permit passage of the associated radiation beam through the fluid in said cell, a shutter of opaque material for preventing passage of radiation from said source to said first mirrors, said shutter having an opening therein to permit passage of radiation from said source to at least one of said first mirrors and reflection thereof through said cells to the other of said mirrors, a motor for driving said shutter, thereby to move said opening to several different positions to permit passage of at least one selected radiation beam between said source and said detector, a cam driven by said motor, a cam-actuated switch connected in the motor circuit to interrupt same at each of said several positions, a timer for supplying short pulses of current to said motor to override the opening of said cam-operated switch and permit movement of the shutter to the next of said several positions, and a trimmer assembly associated with each beam to vary the amount of radiation making up such beam.

11. A photometric analyzer constructed in accordance with claim 9 in which the radiation source is an incandescent filament capable of emitting infra-red radiation and the twin detector unit is a twin bolometer.

12. A photometric analyzer comprising, in combination, a pair of spaced generally circular support decks, a radiation source and a twin radiation detector mounted between said decks along a line connecting the axes of said decks, an even number of mirrors arranged in circular formation upon one of said decks to reflect radiation from said source in paths generally parallel to said axial line, a plurality of mirrors on the other deck for reflecting half of said beams upon one of said detector units and for reflecting the other beams upon the other detector unit, a plurality of axial supporting channels, one for each beam, at least one fluid-containing cell disposed in each channel to permit passage of the associated radiation beam through the fluid in said cell, a shutter of opaque material for preventing passage of radiation from said source to said first mirrors, said shutter having two diametrically opposite openings therein to permit passage of radiation from said source to two diametrically opposite first mirrors and reflection thereof through said cells to the other mirrors, a motor for driving said shutter, thereby to move said openings to several different positions to permit passage of two diametrically opposite radiation beams between said source and said detector, a cam driven by said motor, a cam-actuated switch connected in the motor circuit to interrupt same at each of said several positions, and a timer for supplying short pulses of current to said motor to override the opening of said cam-operated switch and permit movement of the shutter to the next of said several positions.

13. A photometric analyzer comprising, in combination, a pair of spaced generally circular support decks, a radiation source and a twin radiation detector mounted between said decks along a line connecting the axes of said decks, six mirrors arranged in circular formation upon one of said decks to reflect radiation from said source in paths generally parallel to said axial line, six mirrors on the other deck for reflecting three adjacent beams upon one of said detector units and for reflecting the three other beams upon the other detector unit, a plurality of axial supporting channels, one for each beam, the channels for said three adjacent beams each carrying a sample cell and cells containing a pure sample of three components to be analyzed in said sample, said cells being disposed in the paths of the radiation beam, the channels for said three other beams each carrying a sample cell and cells containing pure samples of two of said three components, said two components being different in each cell assembly, said cells being disposed in the paths of the radiation beams, a shutter of opaque material for preventing passage of radiation from said source to said first mirrors, said shutter having two diametrically opposite openings therein to permit passage of radiation from said source to two diametrically opposite first mirrors and reflection thereof through said cells to the other mirrors, a motor for driving said shutter, thereby to move said openings successively to three different positions to permit passage of two diametrically opposite radiation beams between said source and said detector at each position, a cam driven by said motor, a cam-actuated switch connected in the motor circuit to interrupt same at each of said several positions, and a timer for supplying short pulses of current to said motor to override the opening of said cam-operated switch and permit movement of the shutter to the next of said three positions.

14. A photometric analyzer comprising, in combination, a pair of spaced generally circular support decks, a radiation source and a twin radiation detector mounted between said decks along a line connecting the axes of said decks, an even number of mirrors arranged in circular formation upon one of said decks to reflect radiation from said source in paths generally parallel to said axial line, a plurality of mirrors on the other deck for reflecting half of said beams upon one of said detector units and for reflecting the other beams upon the other detector unit, a plurality of axial supporting channels, one for each beam, a cell assembly for each beam disposed in the respective supporting channels, the cell assemblies associated with the first half of said beams each including a sample cell and a cell for selectively absorbing energy of certain wave lengths in the beam, the cell assemblies associated with the other beams each including a sample cell, a shutter of opaque material for preventing passage of radiation from said source to said first mirrors, said shutter has diametrically opposed openings therein to permit passage of radiation from said source to two diametrically opposite first mirrors and reflection thereof through said cells to the other of said mirrors, a motor for driving said shutter, thereby to move said opening to several different positions to permit passage of at least one selected radiation beam between said source and said detector, a cam driven by said motor, a cam-actuated switch connected in the motor circuit to interrupt same at each of said several positions; and a timer for supplying short pulses of current to said motor to override the opening of said cam-operated switch and permit movement of the shutter to the next position.

15. An analyzer constructed in accordance with claim 12 in which the radiation source is a heated filament capable of emitting infra-red radiation and the radiation detector is a bolometer.

16. In a photometric analyzer, in combination, a radiation source, a set of mirrors for reflecting radiation from said source into four parallel beams, a twin detector unit, a set of mirrors for reflecting two of said beams upon the first detector of said unit and two of said beams upon the second detector of said unit, at least one fluid-containing cell disposed in the path of each beam, a two-position shutter which, in each position thereof, interrupts one beam passing to each detector unit, and means for moving said shutter.

17. In a photometric analyzer, in combination, a radiation source, a set of mirrors for reflecting radiation from said source into four parallel beams, a twin detector unit, a set of mirrors for reflecting two of said beams upon the first detector of said unit and two of said beams upon the second detector of said unit, at least one fluid-containing cell disposed in the path of each beam, a two-position shutter which, in each position thereof, interrupts one beam passing to each detector unit, a shutter mechanism comprising a rotatable rod, a pair of opaque plates on said rod, and means for moving said rod and thereby said shutters from a first position wherein the shutters interrupt one of the two beams passing to each detector unit to a second position wherein the shutters interrupt the other of the two beams passing to each detector unit.

ELMER C. MILLER.

REFERENCES CITED

The following references are of record in the file of this patent:

UNITED STATES PATENTS

| Number | Name | Date |
| --- | --- | --- |
| 2,287,322 | Nelson | June 23, 1942 |
| 2,411,672 | Van Den Akker | Nov. 26, 1946 |
| 2,431,019 | Barnes | Nov. 18, 1947 |
| 2,451,572 | Moore | Oct. 19, 1948 |
| 2,499,322 | Mather et al. | Feb. 28, 1950 |
| 2,545,162 | Muly et al. | Mar. 13, 1951 |